US006294093B1

(12) United States Patent
Selvarajan et al.

(10) Patent No.: US 6,294,093 B1
(45) Date of Patent: *Sep. 25, 2001

(54) AQUEOUS DISPERSION OF AN OIL SOLUBLE DEMULSIFIER FOR BREAKING CRUDE OIL EMULSIONS

(75) Inventors: Radhakrishnan Selvarajan, Downers Grove; Ananthasubramanian Sivakumar, Aurora, both of IL (US); Robert A. Marble, Sugar Land, TX (US)

(73) Assignee: Nalco/Exxon Energy Chemicals, L.P., Sugar Land, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/148,930

(22) Filed: Sep. 4, 1998

(51) Int. Cl.$^7$ .............................. B01D 17/05; C09K 3/00
(52) U.S. Cl. ..................... 210/708; 516/161; 516/169
(58) Field of Search .................................. 516/161, 169; 210/708

(56) References Cited

U.S. PATENT DOCUMENTS

| 2,499,370 | 3/1950 | De Groote et al. ................ 516/183 |
| 2,557,081 | 6/1951 | De Groote et al. . |
| 2,602,053 | 7/1952 | De Groote . |
| 3,640,894 | 2/1972 | Sampson .............................. 516/172 |
| 3,676,501 | 7/1972 | Seale et al. . |
| 3,684,735 | 8/1972 | Oppenlaender et al. . |
| 3,699,051 | 10/1972 | Sampson . |
| 3,756,959 | 9/1973 | Vitalis et al. . |
| 3,835,060 | * 9/1974 | Maddox, Jr. et al. ................ 516/158 |
| 3,928,194 | 12/1975 | Tao . |
| 4,175,054 | 11/1979 | Tait et al. . |
| 4,183,821 | 1/1980 | Langdon et al. . |
| 4,309,306 | * 1/1982 | Blair, Jr. .......................... 516/169 X |
| 4,332,686 | * 6/1982 | Gerlach et al. .................. 210/708 X |
| 4,537,701 | 8/1985 | Oppenlaender et al. . |
| 4,539,100 | * 9/1985 | Ronden ............................. 210/708 X |
| 4,737,265 | 4/1988 | Merchant, Jr.. et al. ............. 208/188 |
| 5,100,582 | 3/1992 | Bhattacharyya . |
| 5,256,305 | 10/1993 | Hart ..................................... 210/708 |
| 5,330,650 | 7/1994 | Byrne et al. ......................... 210/708 |
| 5,401,439 | 3/1995 | Elfers et al. ..................... 210/708 X |

FOREIGN PATENT DOCUMENTS

| 774664 | 12/1967 | (CA) . |
| 2 118 937 A | 11/1983 | (GB) . |
| 03229682 | 10/1991 | (JP) . |
| 1268185 | 7/1986 | (RU) . |
| 1766943 | 7/1992 | (RU) . |

* cited by examiner

Primary Examiner—Richard D. Lovering
(74) Attorney, Agent, or Firm—Michael B. Martin; Thomas M. Breininger

(57) ABSTRACT

Demulsification of a water-in-oil, especially a water-in-crude oil, emulsion is effected by contacting it with an aqueous composition having at least one oil-soluble demulsifier and at least one water-soluble surfactant. These aqueous formulations are advantageous over conventional organic formulations of demulsifiers, as the need for toxic and/or flammable/combustible organic solvents is eliminated.

2 Claims, No Drawings

AQUEOUS DISPERSION OF AN OIL SOLUBLE DEMULSIFIER FOR BREAKING CRUDE OIL EMULSIONS

FIELD OF THE INVENTION

Demulsification of a water-in-oil, especially a water-in-crude oil, emulsion is effected by contacting it with a composition having at least one oil-soluble demulsifier and at least one water-soluble surfactant in water. These aqueous formulations are advantageous over conventional organic formulations of demulsifiers, as the need for toxic and/or flammable/combustible organic solvents is eliminated.

BACKGROUND OF THE INVENTION

Water-in-oil (W/O) emulsions occur at many stages in the production and processing of crude oil. Although varying from case to case, the proportion of water produced from an oil well can make up as much as 90 percent by weight or more of the total production. A portion of the produced water is intimately dispersed as small droplets throughout the oil cut due to naturally occurring surfactants in the crude. In addition, synthetic surfactants can be added to recover residual crude trapped in a reservoir. Also, multiple water-in-oil-in-water emulsions requiring additional separation stages can be encountered during the production in fields with a high water to oil ratio especially when steam is used to mobilize heavy crude oils or bitumens.

In crude oil processing (refining), desalting techniques comprise the deliberate mixing of the incoming crude with a fresh "wash water" to extract the water soluble salts and hydrophilic solids therefrom. However, the presence of water in crude oil can interfere with refining operations, induce corrosion, increase heat capacity and reduce the handling capacity of pipelines and refining equipment.

W/O emulsions are commonly believed to be stabilized by the presence of films formed at oil-water interfaces which prevent coalescence of the dispersed droplets. The interfacial activity of crude oils is thought to result from the presence of polar components including asphaltenes, resins and organic acids. For asphaltenes in particular, the presence of heteroatoms in the essentially aromatic structure impart amphiphilic characteristics.

Both physical and chemical methods have generally been employed, usually in combination, to overcome the barrier presented by the films. Common physical methods include the application of electrical fields, heat and gravitational force to increase the frequency and force of droplet to droplet collisions. Chemical agents typically act on the interfacial film by either reacting chemically with the polar crude oil components or by modifying the environment of the dispersed droplets (demulsification). Among chemical agents, interfacially-active demulsifiers which weaken the stabilizing films to enhance droplet coalescence are preferred due to lower addition rates needed.

The formulation of commercial demulsifiers is largely based on empirical approaches in an effort to obtain increasingly effective and universal materials which can work at smaller dosages with shorter separation times. Typically laboratory testing is followed by evaluation under more representative dynamic conditions in a pilot scale process unit and ultimately in the field. The need for extensive empirical testing is the result of a wide range of factors which affect emulsion stability including emulsification conditions such as temperature and pressure; the nature of the aqueous phase (e. g. salinity and pH); the water-oil ratio; and the composition of the crude oil. Crude oil specificity has long been recognized and many demulsifier products are formulated as a mixture of agents in a carrier solvent to improve performance.

Early demulsification relied on the reversal of the emulsion type demulsifier such as hydrophilic ionic surfactants. These types were followed by oil-compatible, non-ionic surfactants based on ethylene and propylene oxide resins. Recently, chemical demulsifier components include alkoxylated phenolic resin adducts and polyalkylene glycols.

Water-soluble polymeric demulsifiers such as the emulsion tetrapolymer of methylmethacrylate, butyl acrylate, acrylic acid and methacrylic acid in U.S. Pat. No. 5,100,582 and dispersions of water-soluble cationic polymers in U.S. Pat. No. 5,330,650 have also been utilized.

Specific examples of oil-soluble demulsifiers include combinations of polyoxylalkylated alkyl phenol formaldehyde polycondensates with reaction products of diisocyanates and polyoxyalkylated compounds in U.S. Pat. Nos. 3,640,894 and 3,699,051; combinations of oxyalkylated alkyl phenol-aldehyde resins and hydrocarbon polymers in U.S. Pat. No. 4,175,054; alkoxylates in U.S. Pat. No. 5,401,439; the reaction product of diglycidyl groups of an ether with the hydroxyl groups of a polyoxylated alkyl phenol formaldehyde polycondensate in U.S. Pat. No. 3,676,501; polyoxyalkylenes in U.S. Pat. No. 4,183,821; and dicarboxyl acid esters of sulfated oxyalkylated alkyl phenol formaldehyde resins in Canadian Patent No. 774,664. Typically, these oil-soluble demulsifiers are formulated in organic solvents alone such as toluene, xylene, tetrahydrofuran, dioxane, lower alcohols and light gasoline fractions having boiling limits of from 50 to 200° C.; or in co-solvents comprising organic solvents and water wherein the organic solvents are usually $C_3$ to $C_{10}$ alkanols, ethylene diamine, diethylene triamine, or ethanolamines including diethanolamine as exemplified by U.S. Pat. Nos. 4,737,265 and 5,401,439.

Among the disadvantages of having organic solvents in a demulsifier formulation are increased cost, flammability, and toxicity. Therefore, a demulsifier formulation which does not include organic solvents would represent an advance in the art of demulsification.

Demulsification by use of oil-soluble demulsifiers in conjunction with an added excess of water has been disclosed in S.U. 1268185; U.S. Pat. Nos. 5,256,305 and 3,928,194 and JP 03229682. Moreover, combinations of oil-soluble and water-soluble demulsifiers in water have been disclosed in S.U. 1766943. Water-soluble demulsifiers in combination with water-soluble surfactants and oil-soluble surfactants have been disclosed in U.S. Pat. No. 3,756,959. However, these references do not suggest that an stable aqueous formulation of an organic demulsifier or demulsifiers can be made in the presence of water-soluble surfactants.

Accordingly, an object of the present invention is to provide novel, economical and effective processes for resolving emulsions into their component parts of oil and water or brine.

Another object of the present invention is to provide a demulsifier system which breaks the emulsions rapidly and completely at both elevated temperatures and low temperatures and which leaves virtually no residual water and residual salt in the product, and no residual emulsion in the water which is separated off.

It is a further object of the invention to use such demulsifier formulations for carrying out an advantageous process for breaking crude oil emulsions, which process gives crude oils which are free from water and salt, and waste water which is substantially free from emulsion.

Our invention meets such objects by providing an aqueous formulation for oil soluble demulsifiers, made soluble by the addition of surfactants.

Other objects, advantages and features of the invention are described hereinafter.

SUMMARY OF THE INVENTION

Demulsification of a water-in-oil, especially a water-in-crude oil, emulsion is effected by contacting it with a composition having at least one oil-soluble demulsifier and at least one water-soluble surfactant in water. These aqueous formulations are advantageous over conventional organic formulations of demulsifiers, as the need for toxic and/or flammable/combustible organic solvents is eliminated.

DESCRIPTION OF THE INVENTION

The present water-in-crude oil emulsion breaker formulation can be used to demulsify water-in-oil emulsions of polar type petroleum crudes in various production and refinery processes. In a refinery desalting process, the incoming crude is deliberately mixed with a wash water to remove dissolved salts and other contaminants. To extract water from the resulting water-in-crude oil emulsion, the emulsion is admixed with an effective amount of the present emulsion breaker formulation.

The crude oils which can be advantageously demulsified with the formulations of the present invention are generally polar crudes (typically above 10 percent polars in hydrocarbons, especially above 20 percent) having high asphaltene content (typically 1–10% asphaltenes in hydrocarbons), a high aromatic content (typically 15–30% aromatics in hydrocarbons) and a low paraffin content (typically less than 50% paraffins in hydrocarbons, especially less than 30%). Venezualan crudes are exemplary of polar crude oils advantageously treated in accordance with the present invention.

The use of the demulsifiers of the invention is not limited to crude petroleum oil emulsions but extends to the breaking of hydrocarbon emulsions derived from refined mineral oil, gasoline, kerosene, etc. Their use provides a method which is also of significant value in removing water-soluble impurities such as dissolved inorganic salts from hydrocarbon based compositions, particularly in processes for the desalting of crude petroleum oil.

While the demulsifiers of the invention are particularly desirable in the demulsification of crude petroleum oil, it is contemplated that for this application as well as the demulsification of other hydrocarbon based fluids that the demulsifiers of the invention can be used in admixture with other suitable well-known classes of demulsifying agents which can be used in their water-soluble form or in their oil-soluble form, or in a form exhibiting both oil and water-solubility.

In the process of resolving crude petroleum oil emulsions of the water-in-oil type, the demulsifying agent of the invention is brought into contact with or caused to act upon the emulsion to be treated in any of the various methods now generally used in the petroleum industry to resolve or break crude petroleum oil emulsions with a chemical agent. The demulsifiers are frequently used in combination with crude petroleum oil in a weight ratio of 1:5,000 to 1:50,000, preferably about 1:10,000 to about 1:30,000 parts by volume of demulsifier crude petroleum oil.

The demulsifiers of the invention can be used in both batch and continuous processes for demulsification of crude petroleum oil. In a batch treatment process, generally a volume of emulsified oil in a tank is admixed with demulsifier by suitable agitation. Heating the crude oil emulsion, the demulsifier or the crude oil-demulsifier mixture can improve the dispersion of the demulsifier in the crude petroleum oil. Generally, said mixture is heated to a temperature of about 1000° F. to 1700° F/, preferably about 130° F. to 140° F. Adequate dispersion of the demulsifier in the crude petroleum oil can also be accomplished by use of a circulating pump which withdraws a portion of the crude petroleum oil emulsion from the tank and reintroduces it, for instance, into the top of the tank. In this procedure the demulsifier of the invention can be added at the suction side of the circulating pump.

Introduction of the composition of the invention into the crude petroleum oil well field at the well-head or at a point between the well-head and the final oil storage tank also provides a means of incorporating the demulsifier of the invention into crude petroleum oil so as to effect separation of emulsified crude petroleum oil into layers of oil and water. Once separation into distinct layers of water and crude petroleum oil has been effected, various means can be utilized for withdrawing the free water and separating the purified crude petroleum oil. Use of the demulsifiers of the invention beneath the surface in the oil well itself, either continuously or periodically in either diluted or undiluted form, can be accomplished in order to effect dispersion of the demulsifier of the invention so that upon obtaining the crude petroleum oil emulsion at the surface the emulsion can be treated to effect separation without the additional step of incorporating the demulsifier subsequent to the withdrawal of the crude petroleum oil from the well. As can be seen, the broad process of demulsification contemplated herein consists of incorporation of the demulsifier of the invention into an emulsion of crude petroleum oil or other hydrocarbon, allowing the emulsion to stand in a quiescent state until the desired separation into distinct layers of water and oil results. Generally, the time for separation or stratification of the layers of water and oil is about 5 minutes to about 50 minutes, preferably about 10 minutes to about 30 minutes. Subsequently, the desired purified crude petroleum oil or other hydrocarbon is separated from the mixture.

A typical process for demulsification of crude oil is as follows: A reservoir is provided to hold the composition of the invention in either diluted or undiluted form adjacent to the point where the effluent crude petroleum oil leaves the well. For convenience the reservoir is connected to a proportioning pump capable of dropwise injecting the demulsifier of the invention into the fluids leaving the well which then pass through a flow line into a settling tank. Generally, the well fluids pass into the settling tank at the bottom of the tank so that incoming fluids do not disturb stratification of the layers of crude petroleum oil and water which takes place during the course of demulsification. Demulsification is started by setting the proportioning pump to feed a comparatively large volume ratio of demulsifier for instance, 1:5,000, demulsifier crude petroleum oil, and this proportion is decreased subsequent to satisfactory demulsification of the crude petroleum oil emulsion so that a just sufficient amount of demulsifier is utilized such as amounts by volume of one part demulsifier to 10,000 to 50,000 parts of crude petroleum oil. The actual amount required will depend upon the particular system to be treated.

One aspect of this invention is an aqueous composition consisting essentially of:
a) at least one oil-soluble demulsifier;
b) at least one water-soluble surfactant;
c) and the balance water.

The oil-soluble demulsifier may be present at a concentration of from about 10 to about 50% by weight in the aqueous formulation, and the water-soluble surfactant may be present at a concentration of from about 0.2 to about 8% by weight in the aqueous formulation. The oil-soluble demulsifier may be a combination of a dicarbamate and a polyoxyalkylated alkylphenol resin,
wherein said dicarbamate is formed as the reaction product of:
from about 1 to 15% by weight of a diisocyanate, and
from about 85 to 99% by weight of a polyoxyalkylated compound of the formula $$H(OCH_2CH_2)_x(OR_1)_yOR_2$$

where y is an integer from 2 to 70; $R_1$ is a radical selected from the group consisting of

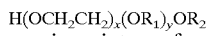

—CH$_2$CH$_2$—   and   —CH$_2$—CH—,
                              |
                              CH$_3$ $R_2$ is a radical selected from the group consisting of —H and —CH(CH$_2$CH$_2$OH)$_2$; and x is an integer from 0 to 40;
and said polyoxylated alkyl phenol resin is of the formula

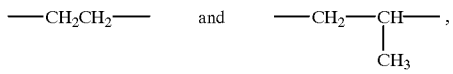

H[OC$_6$H$_3$—CH$_2$—C$_6$H$_3$O]$_a$(—CH$_2$CHO)$_b$(R$_1$O)$_c$H
       |              |                    |
       R$_3$           R$_3$                 CH$_3$ where a is an integer from 1 to 8; b is an integer from 1 to 40; c is an integer from 0 to 40; $R_1$ is a radical selected from the group consisting of —C$_2$CH$_2$—

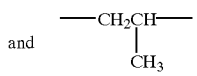

and       —CH$_2$CH—
              |
              CH$_3$ and $R_3$ is a hydrocarbon group having from 4 to 12 carbon atoms in chain length.

Moreover, the dicarbamate may be the reaction product of toluene diisocyanate and an oxyalkylated polyol, said resin may be an ethoxylated/propoxylated nonylphenolformaldehyde condensate and said water-soluble surfactant may be a combination of sulfated nonylphenol ethoxylate and octylphenol ethoxylate in a ratio of surfactants of from about 0.2:1 to about 1.2:1.

Another aspect of this invention is a method for separating water from a crude oil emulsion of water and oil, comprising the steps of:

a) treating said crude oil emulsion with an effective demulsifying amount of an aqueous composition of:
  i. at least one oil-soluble demulsifier;
  ii. at least one water-soluble surfactant;
  iii. and the balance water;
b) coalescing water droplets from said emulsion; and,
c) removing coalesced water.

Preferably, the effective amount of said aqueous composition added to said crude oil emulsion may be from about 10 to about 1,000 ppm.

The Oil-Soluble Demulsifiers

Typical demulsifiers for breaking crude oil emulsions which may have utility in the formulations described herein have been disclosed in U.S Pat. Nos. 2,499,370; 2,557,081; 2,602,053; 3,684,735 and 4,537,701; all of which are hereby incorporated by reference and in U.K. Patent No. 2,118,937A. Specific examples of useful oil-soluble demulsifier combinations of dicarbamates and resins are found in U.S. Pat. Nos. 3,699,051 and 3,640,894; the disclosures of which are hereby incorporated by reference.

The oil-soluble demulsifier may be selected from the group consisting of: oxyalkylated alkyl phenol resins, oxyalkylated amines, glycol resin esters, bisphenol glycol ethers, bisphenol glycol esters, salts of alkylaryl sulfonic acid, dicarbamates, oxyalkylated polyols reacted with compounds selected from the group consisting of: diepoxides and polycarboxylic acids, unreacted oxyalkylated polyols, unreacted oxyalkylated phenolic resins and combinations thereof. The demulsifier may therefore be a single demulsifier, or a combination or blend of more than one demulsifier. Which demulsifier to be used, as well as whether to use a single demulsifier or a blend will depend upon the particular system to be treated, so it is envisaged that potentially any oilsoluble demulsifier can be used for the practice of this method. One preferred single demulsifier is a dicarbamate which is the reaction product of a di-isocyanate with a polyoxyalkylated polyol. One preferred demulsifier blend is the above-mentioned dicarbamate in combination with an oxyalkylated nonylphenol resin.

The Water-Soluble Surfactants

Water-soluble surfactants useful for the practice of this invention include: sodium isopropyl naphthalene sulfonate, other alkylaryl sulfonates, mixed octyldecylarnine octyldecylguanidine polyoxyethanol, and others obtained under a wide variety of trade designations in the industry. These include sodium dodecylbenzene sulfonate, stearamidopropyldimethyl-beta hydroxyethyl ammonium nitrate, tall oil ethoxyethylate with from about 6 to 15 moles of ethylene oxide, sodium lauryl sulfate, sodium octadecyl sulfate, sodium alkyl sulfates from alpha olefins or from oxo-process alcohols, ethoxylated nonylphenols, phosphated fatty alcohol ethoxylates such as phosphated oleyl or tridecyl ether with from about 2 to about 10 moles of ethoxylation. Cationic surfactants may also be useful for the practice of this invention. Among the useful cationic surfactants are quaternary ammonium compounds such as $C_{12}$–$C_{16}$ alkyl quaternary ammonium salts, dimethyl benzyl ammonium chloride, ethoxylated and/or propoxylated quaternary ammonium chloride, fatty amine ethoxylates and their corresponding quaternary ammonium salts.

The amount of surfactant to be utilized will be proportionally dependent upon the amount of the demulsifier or demulsifier blend in the formulation. Which particular surfactant to be utilized, as well as whether to use a single surfactant or a blend of surfactants will depend upon which demulsifier was selected to treat the particular system of interest. Preferred water-soluble surfactant blends include octylphenol ethoxylate with nonylphenol ethoxylate sulfate, sodium dodecyl sulfate with $C_8$–$C_{16}$ alkyl glucopyranoside ether, sodium dodecyl sulfate with $C_8$–$C_{10}$ alkyl glucopyranoside ether, and sodium dodecyl sulfate with ethylene oxide/propylene oxide block copolymer among others.

The following examples are presented to describe preferred embodiments and utilities of the invention and are not meant to limit the invention unless otherwise stated in the claims appended hereto.

EXAMPLE 1

The oil-soluble dicarbamate demulsifier was synthesized according to the following procedure. A diisocyanate and polyoxyalkylated compound were reacted at from 40 to 120° C. for from 5 minutes to 3 hours. This reaction is relatively simple and fast. Once the ingredients were combined at the appropriate temperature, the reaction was practically simultaneous, yet the temperature was maintained for some time to be sure that it is complete. The following is an exemplary specific procedure for preparing the copolymers.

1) Add 200 grams polypropylene glycol with 15 moles of ethylene oxide adduct, and 2 grams glacial acetic acid, to a 1000 ml. 3-neck flask, equipped with a mechanical stirrer and thermometer.
2) Heat while stirring to 60° C. (140° F.) and maintain for 30 minutes.
3) Slowly add 6 grams toluene diisocyanate; hold 15 minutes.
4) Heat to 100° C. (212° F.) and maintain for one hour.
5) Cool and add solvent to make a solution. The solvent can be any standard hydrocarbon solvent. Characterization of the resultant viscous liquid with FTIR confirmed the formation of the carbamate and the absence of the isocyanate groups.

EXAMPLE 2

The aqueous demulsifier compositions were formulated in the following manner. The surfactants octyl phenol ethoxylate (Igepal CA-887, available from Rhone Poulenc of Dayton, N.J.) and nonyl phenol ethoxylate sulfate (Rhodapex CO-436, available from Rhone-Poulenc of Dayton, N.J.) were dissolved in water using a magnetic stirrer. The dicarbamate was added slowly to the above solution while mixing with a magnetic stirrer to form a smooth dispersion. For compositions A and B, after addition of the dicarbamate, the alkoxylated nonyl phenol resin was added slowly to the water to form a smooth dispersion. The solvent contained in the phenolic resin was also dispersed as an emulsion in water. These formulations were solubilized in water for efficacious treatment, but also remained stable in aqueous solution for a very long time. Over an eight month period the formulations were monitored. The components did not split out during that period. Moreover, at the end of that period the formulations were re-tested and found to have maintained their demulsifying capabilities.

Aqueous Demulsifier Formulations

TABLE I

| Formulation # | Demulsifier 1 (%) | Demulsifier 2 (%) | Surfactant A (%) | Surfactant B (%) | Water (%) |
|---|---|---|---|---|---|
| 1 | 23.1 | 2.9 | 2.0 | 1.2 | 70.8 |
| 2 | 24.7 | 0 | 1.5 | 1.3 | 72.5 |

Demulsifier 1 = diethyleneoxypropyleneoxy toluene dicarbamate available from Nalco Chemical Co. of Naperville, IL
Demulsifier 2 = oxyalkylated nonyl phenol resin (12.5% propylene oxide and 37.5% ethylene oxide) in heavy aromatic naphtha available from Nalco Chemical Co. of Naperville, IL
Surfactant A = octylphenol ethoxylate, available from Rhone-Poulenc of Dayton, NJ
Surfactant B = nonylphenol ethoxylate sulfate, available from Rhone-Poulenc of Dayton, NJ Formulations containing other surfactants were also made up. Each of the formulations defined in Table II below did form stable dispersions in water.

Other Aqueous Demulsifier Formulations

TABLE II

| Formulation # | Demulsifiers | | Surfactants | | | | | Water (%) |
|---|---|---|---|---|---|---|---|---|
| | 1 (%) | 2 (%) | C (%) | D (%) | E (%) | F (%) | G (%) | |
| 3 | 30.1 | 0 | 1.0 | 1.0 | — | — | — | 67.9 |
| 4 | 16.8 | 2.1 | 0.83 | — | 2.0 | — | — | 78.27 |
| 5 | 26.9 | 0 | 0.98 | — | — | 0.98 | — | 71.14 |
| 6 | 16.6 | 2.0 | 1.7 | — | — | — | 2.0 | 77.7 |

Demulsifier 1 = diethyleneoxypropyleneoxy toluene dicarbamate available from Nalco Chemical Co. of Naperville, IL
Demulsifier 2 = oxyalkylated nonyl phenol resin (12.5% propylene oxide and 37.5% ethylene oxide) in heavy aromatic naphtha vailable from Nalco Chemical Co. of Naperville, IL
Surfactant C = sodium dodecylsulfate available from Aldrich Chemical Co. of Milwaukee, WI
Surfactant D = $C_8$–$C_{16}$ alkyl glucopyranoside ether available from Henkel Corporation of Ambler, PA
Surfactant E = $C_8$–$C_{10}$ alkyl glucopyranoside ether available from Henkel Corporation of Ambler, PA
Surfactant F = 80/20 EO/PO block copolymer, MW = 11,400, available from BASF Corporation of Mt. Olive, NJ
Surfactant G = 80/20 EO/PO block copolymer, MW = 14,600, available from BASF Corporation of Mt. Olive, NJ

EXAMPLE 3

Bottle testing to determine the efficiency of the aqueous compositions 1 and 2 was conducted according to the following procedure: Fresh samples of the emulsionbreaking compositions in aqueous solution were prepared in 10% solutions.

By means of the 0.2 milliliter pipette, the prescribed volume of the 10% solution of the emulsion breaking composition was added to the emulsion in the bottles. The bottles were then capped and given manual agitation for a predetermined number of counts mechanical agitation for a specific amount of time and frequency. The degree of agitation was determined by a survey of the agitation which can be secured in the system which the crude oil emulsion is being used. If the emulsion required heat for treatment, the bottles were placed in hot water bath, the length of time and temperature determined by the particular plant equipment and practice in which the particular emulsion is employed. If the plant provides for hot agitation of the emulsion the bottles may be given a corresponding amount of manual hot agitation.

The bottles were then removed from the hot water bath and the water drop, presence of the bottom settlings (B.S.) layer and color and general appearance of the oil were noted.

A thief grind-out was taken on all bottles which appear to be promising. A thief grind-out was made by preparing centrifuge tubes filled with gasoline to the 50% mark. The thief pipette was set to the proper length by adjusting the rubber stopper so that the bottom of the pipette was about ¼ inch above the oil-water level of the bottle with maximum water drop. This same setting was used for all subsequent thiefings on remaining bottles. The thiefed oil from each bottle was added to the centrifuge tube to the 100% mark, and the tube was shaken. The samples were then centrifuged for three minutes.

With certain paraffin base oils a portion of the paraffin is thrown down with the B.S. If the centrifuge tubes are heated to 150° F., the paraffin will melt and be dissolved in the gasoline-oil mixture and usually will not be thrown down again with the B.S. upon centrifuging while hot. However, occasionally the paraffin will re-congeal as the tube cools during centrifuging. If this occurred, the tube was removed from the centrifuge and heated to 150° F. without shaking or disturbing the settled B.S. layer. The heated sample was then centrifuged for 15 seconds, to give a true B.S. reading free of paraffin.

An excess chemical grind-out was then run on each centrifuge by adding several drops of a 20% solution in white gasoline or other solvent of a chemical which caused complete separation of the water and oil. With some sensitive emulsions the chemical will cause re-emulsification. In these instances it was necessary to re-thief and add a lesser amount. Each tube was shaken vigorously to make sure that the B.S. layer is broken up and the tubes heated to 150° F. in the case of troublesome paraffin base crude oil. The samples were then centrifuged for three minutes.

In the ideal treatment of crude oil emulsions the oil-water line should be a sharp, clean line without any web or sludge present. Presence of a considerable amount of sludge or web is undesirable because this foreign material will eventually go to stock in the treating plant and be reported as B.S. Traces of web or sludge, however, will disappear or be removed in the normal treating plant.

In almost all instances the thief grind-out and excess chemical grind-out readings indicated that the aqueous compositions of the instant invention had most nearly produced crude oil free from B.S. and water. The most efficient emulsion breaking chemical is determined by the foregoing test procedure by the overall consideration of the following factors: relative speed of the breaking of the emulsion which is usually indicated by speed of water drop, color and brilliance of the oil layer, the relative absence of web or sludge at oil-water line and the ability to most nearly produce treated oil that is free from B.S. and water.

Table III illustrates the demulsification capabilities of representative Formulations 1 and 2. Formulations 4 and 6 would be expected to perform similarly to Formulation 1; and Formulations 3 and 5 would be expected to perform similarly to Formulation 2. Aqueous Formulation 1 is compared to A, the corresponding conventional organic formulation of the same demulsifier blend and Aqueous Formulation 2 is compared to C, the corresponding conventional organic formulation of the same demulsifier. Formulation A at a dose of 87 ppm is most directly comparable to the formulation 1 at 96 ppm. The quality of the recovered oil is much better, and a larger amount of water is separated out sooner with aqueous Formulation 1 than with the conventional organic Formulation A.

Table 3 illustrates that the formulations disclosed herein are superior to either dicarbamates in organic solvents, or dicarbamates alone in water. The greater the amount of water measured at the bottom of the bottle in the shorter amount of time as the emulsion breaker is added indicates that the emulsion breaker is more efficient at separating the oil and water layers.

Once the separation occurred, the samples were remixed to form another emulsion to mimic field conditions under which re-emulsification may occur. The results show that the emulsion breaker was still useful upon re-emulsion to perform a separation, and moreover, that it worked more efficiently the second time than comparative formulation D did.

The last three columns of Table III describe the quality of oil recovered, as a result of the demulsification with the novel aqueous demulsifier formulations. Optimally, no water or solids would be found at all in the recovered oil, so the lower the numbers for the last three columns, the better the formulation.

TABLE III

Bottle Testing to Screen Emulsion Breakers; Aqueous Demulsifier Formulations vs. Conventional Organic Demulsifier Formulations

| Formulation | Dose[1] (ppm) | am't water separated (ml) at | | | am't water separated after redispersion (ml) at | | | B.S. % | water % | Slug BS&W % |
|---|---|---|---|---|---|---|---|---|---|---|
| | | 5 min | 10 min | 30 min | 2 min | 11 min | 240 min | | | |
| A | 87 | 37 | 50 | 52 | 30 | — | 58 | 0.8 | 2 | 3.6 |
| B | 48 | 2 | 9 | 38 | 26 | — | 49 | 19.2 | 0.8 | 19 |
| B | 96 | 20 | 43 | 57 | 59 | — | 60 | 0 | 0 | 1 |
| C | 240 | 0 | 0 | 0 | 0 | 0 | — | — | — | — |
| D | 90 | 2 | 3 | 10 | 5 | 22 | — | — | — | — |

1 = on an equal actives basis
A = conventional organic formulation, a blend of dicarbamate of polyoxyalkylate (38.3%) and oxyalkylated nonylphenol resin (4.7%) demulsifiers in heavy aromatic naphthta, 57% of the blend in the organic solvent
B = aqueous Formulation 1 of Table I
C = conventional organic formulation, a dicarbamate of polyoxyalkylate demulsifiers in heavy aromatic naphtha
D = aqueous Formulation 2 of Table I The present invention is illustrated by way of the foregoing description and examples. The foregoing description is intended as a non-limiting illustration, since many variations will become apparent to those skilled in the art in view thereof. It is intended that all such variations within the scope and spirit of the appended claims be embraced thereby.

Changes can be made in the composition, operation and arrangement of the method of the present invention described herein without departing from the concept and scope of the invention as defined in the following claims.

What is claimed is:

1. A stable aqueous formulation of a water-insoluble organic demulsifier consisting essentially of:
   a) a water-insoluble oil-soluble organic demulsifier;
   b) a water soluble surfactant; and
   c) balance water,
   wherein the water-insoluble oil-soluble organic demulsifier is a combination of a dicarbamate and a polyoxyalkylated alkylphenol resin, wherein the dicarbamate is the reaction product of from about 1% to about 15% by weight of toluene diisocyanate and from about 85% to about 99% by weight of an oxyalkylated polyol of formula:

$$H(OCH_2CH_2)_x(OR_1)_yOR_2$$

where y is an integer from 2 to 70; $R_1$ is a radical selected from the group consisting of $$-CH_2CH_2- \quad \text{and} \quad -CH_2-\underset{CH_3}{CH}-,$$

$R_2$ is a radical selected from the group consisting of —H and —CH(CH$_2$CH$_2$OH)$_2$; and x is an integer from 0 to 40; the polyoxyalkylated alkylphenol resin is an ethoxylated/propoxylated nonylphenol-formaldehyde condensate; and the water-soluble surfactant is a combination of sulfated nonylphenol ethoxylate and octylphenol ethoxylate in a ratio of surfactants of from about 0.2:1 to about 1.2:1.

2. A method for separating water from a crude oil emulsion of water and oil, comprising the steps of:
   a) treating said crude oil emulsion with an effective demulsifying amount of an aqueous composition consisting essentially of:
      i. at least one water-insoluble oil-soluble organic demulsifier;
      ii. at least one water-soluble surfactant;
      iii. and the balance water;
   wherein the water-insoluble oil-soluble organic demulsifier is a combination of a dicarbamate and a polyoxyalkylated alkylphenol resin, wherein the dicarbamate is the reaction product of from about 1% to about 15% by weight of toluene diisocyanate and from about 85% to about 99% by weight of ethylene oxide/propylene oxide block copolymer, the polyoxyalkylated alkylphenol resin is an ethoxylated/propoxylated nonylphenol-formaldehyde condensate and the water-soluble surfactant is a combination of sulfated nonylphenol ethoxylate and octylphenol ethoxylate in a ratio of surfactants of from about 0.2:1 to about 1.2:1.
   b) coalescing water droplets from said emulsion; and,
   c) removing coalesced water.

* * * * *